March 27, 1951 L. J. ANDRES 2,546,845

SELECTIVE RECORD PLAYER

Filed March 25, 1944 9 Sheets-Sheet 1

INVENTOR.

Lloyd J. Andres

March 27, 1951 L. J. ANDRES 2,546,845

SELECTIVE RECORD PLAYER

Filed March 25, 1944 9 Sheets-Sheet 2

INVENTOR.

Lloyd J. Andres

March 27, 1951 L. J. ANDRES 2,546,845

SELECTIVE RECORD PLAYER

Filed March 25, 1944 9 Sheets-Sheet 3

INVENTOR.

Lloyd J Andres

March 27, 1951 L. J. ANDRES 2,546,845

SELECTIVE RECORD PLAYER

Filed March 25, 1944 9 Sheets-Sheet 4

INVENTOR.

Lloyd J. Andres

SELECTIVE RECORD PLAYER

Filed March 25, 1944 9 Sheets-Sheet 5

INVENTOR.

Lloyd J Andres

SELECTIVE RECORD PLAYER

Filed March 25, 1944 9 Sheets-Sheet 6

Inventor:
Lloyd J. Andres

INVENTOR.

Lloyd J Andres

SELECTIVE RECORD PLAYER

Filed March 25, 1944 9 Sheets-Sheet 8

Inventor

Lloyd J. Andres

INVENTOR.

Lloyd J. Andres

Patented Mar. 27, 1951 2,546,845

UNITED STATES PATENT OFFICE 2,546,845

SELECTIVE RECORD PLAYER

Lloyd J. Andres, Chicago, Ill., assignor to Automatic Instrument Company, Chicago, Ill., a corporation of Michigan Application March 25, 1944, Serial No. 528,115

4 Claims. (Cl. 274—10)

This invention relates in general to phonographs and more particularly to a new record player for automatically and selectively playing both sides of a plurality of disc records of different diameters.

Record players previous to this invention for accomplishing similar results were excessively complicated, expensive to construct, troublesome in operation and usually limited to the playing of records of exacting dimensions not found in generally available commercial records.

This invention overcomes the above mentioned objections by utilizing record holder, U. S. Patent No. 2,285,139, whereby a repertoire of records of different diameters may be selectively played on both sides utilizing an assembly of simple positively functioning elements which are adapted to relatively low cost manufacture and trouble-free operation.

The principal object of the invention is the provision of a mechanism which will automatically and selectively play either side of one or a plurality of records of different diameters when initiated.

A further object of the invention is the provision of electro-mechanical means whereby the reproducer of the mechanism is automatically positioned to properly begin to play records of different outside diameters.

A further object of the invention is the provision of a record transfer transmission using constantly engaged gear trains.

A further object of the invention is the provision of means for utilizing record holders for extending the effective diameter of smaller size records and utilizing the electrical conductivity properties of said holder for selectively prepositioning the reproducer to properly engage the starting grooves of the records of smaller diameters retained by said holders.

Other objects and advantages of a preferred embodiment of the invention will be apparent from the specification and drawings in which.

Figure 1:
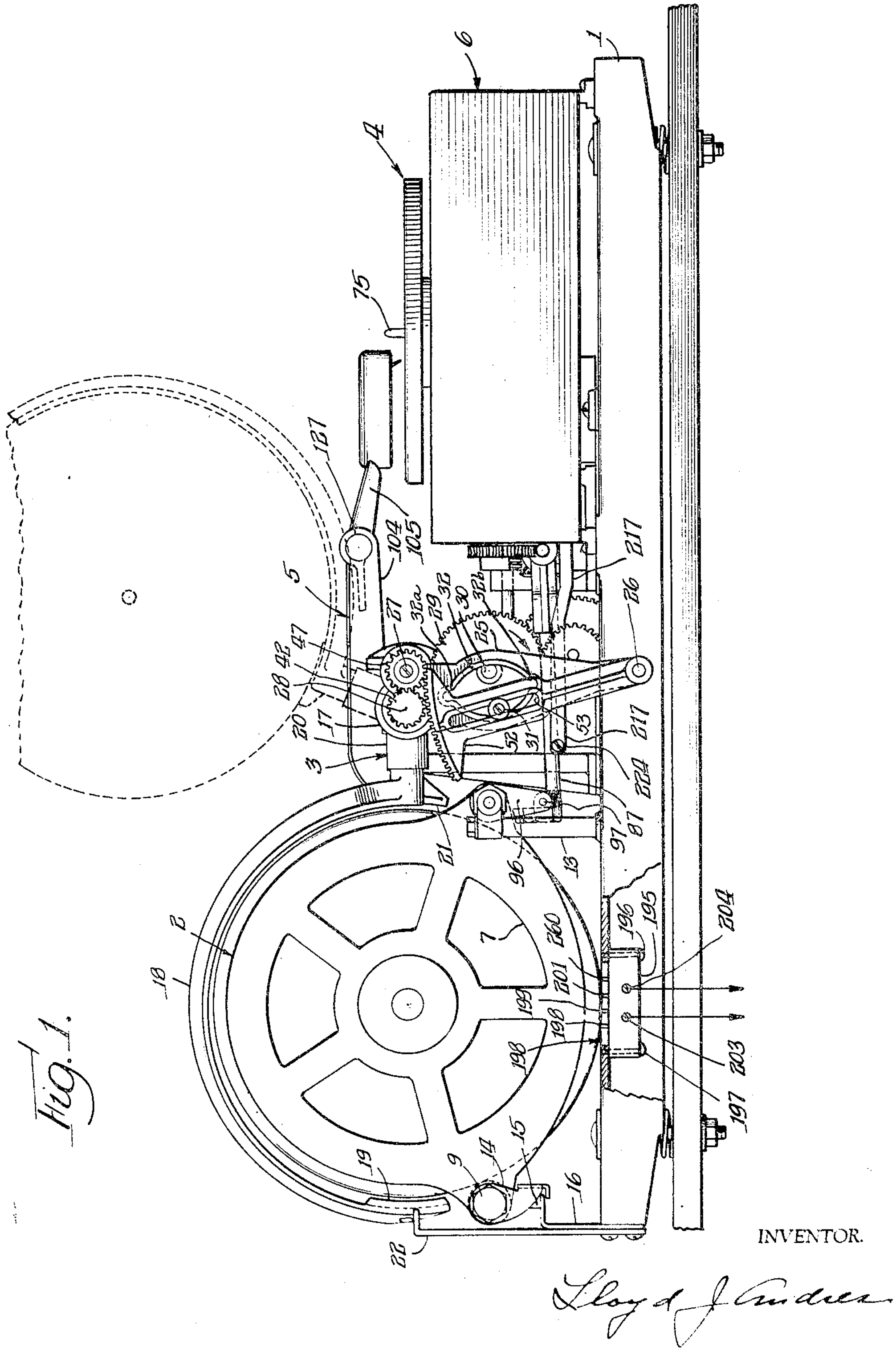
Fig. 1 is a side view elevation of the record player with the dotted partly broken away section showing intermediate position of the record and the transfer mechanism.
Figure 2:
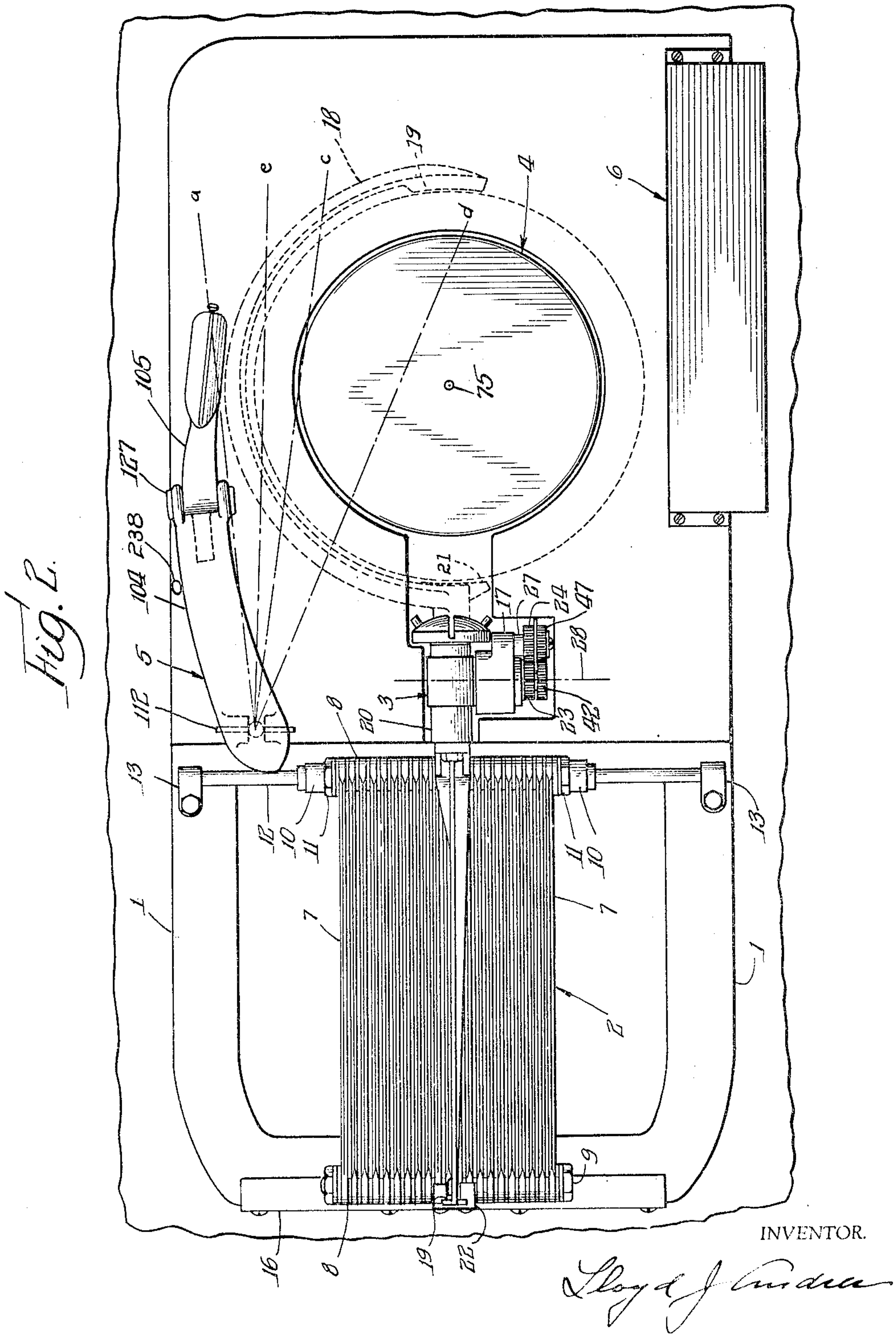
Fig. 2 is an enlarged plan view of the record player shown in Fig. 1.
Figure 3:
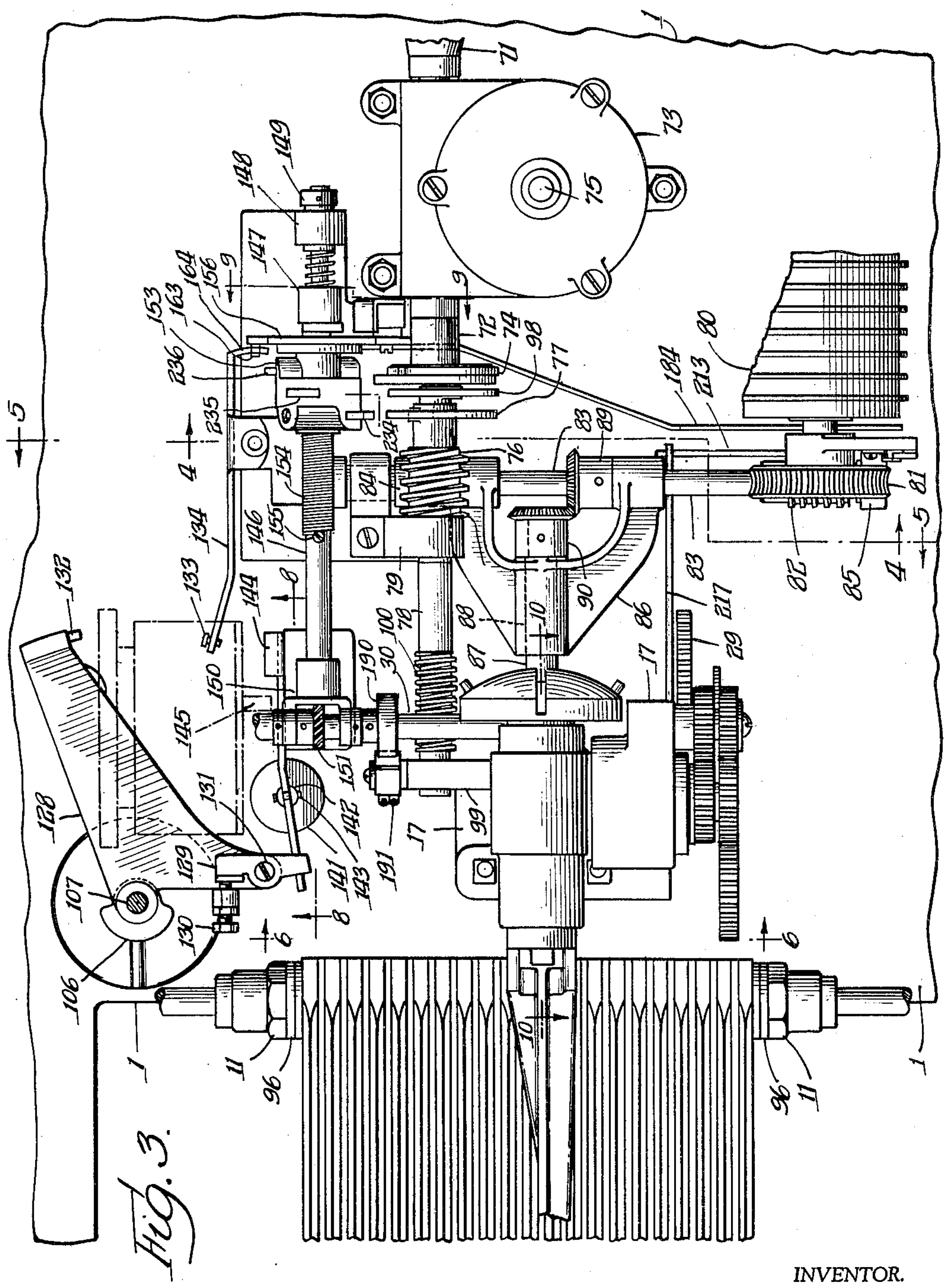
Fig. 3 is a fragmentary plan view of the mechanism shown in Fig. 2 with cover removed.
Figure 15:
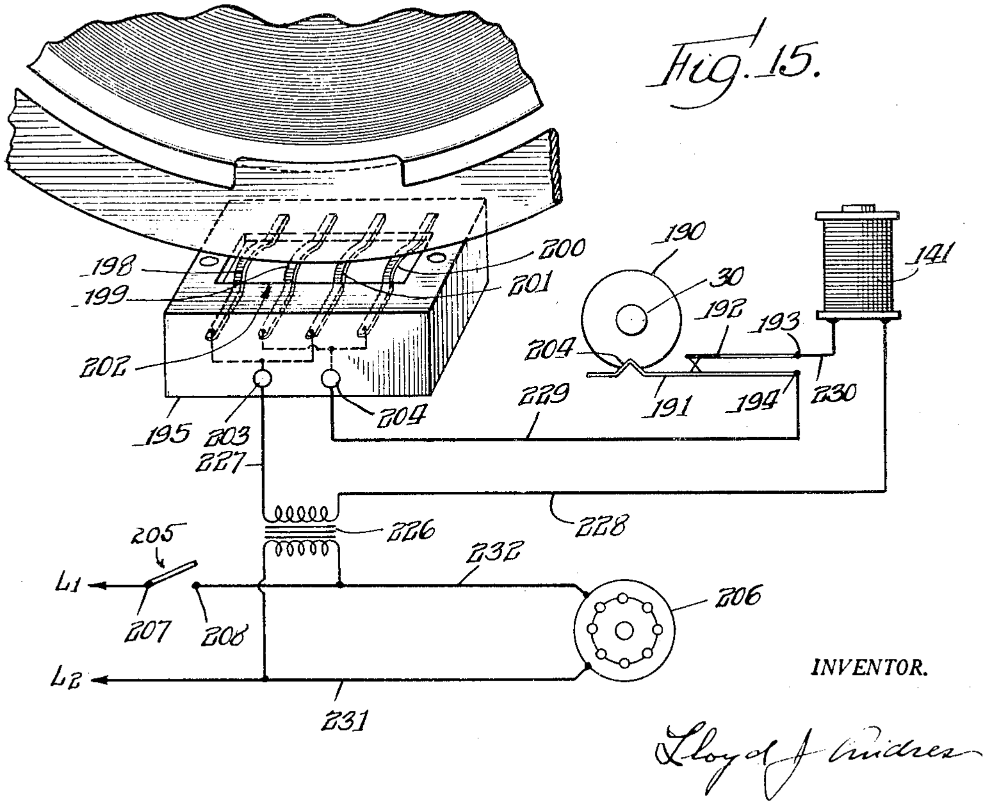
Fig. 15 is a diagrammatic illustration of electro-mechanical elements and electric circuit.

Referring to Figs. 1 and 2, the mechanism comprises, in general, the following units, namely; a base 1; a laterally movable magazine assembly 2 for holding a plurality of records in vertical spaced relation; a record transfer mechanism 3; a fixed horizontal turntable assembly 4; a pivotally mounted reproducer arm assembly 5; a self-restoring selector assembly 6; a transmission shown in Fig. 3, electrical and mechanical control elements for the above units shown in Fig. 15 hereinafter described and shown in the respective drawings.

*Record magazine*

Referring to Figs. 1 and 2, the record magazine 2 consists of a plurality of record supports 7 held in vertical spaced relation with each other by spacers 8, tie bolt 9, nut 9A and sleeve and nuts 10 and 11 respectively. One end of the magazine is slidably supported by sleeve 10 on shaft 12 affixed to the base 1 at opposite ends by supports 13 integrally secured to base 1. In the center of the opposite end of the magazine, a bracket 14, serving as one spacer 8, carries a pivotally mounted roller 15 with its periphery positioned to rest on a horizontal track 16 secured to the base with its upper working surface parallel with shaft 12.

Disc records of a predetermined maximum size are retained between the supports 7 and held in concentric axial alignment by resting on the edges of the spacers 8. Each spacer, at its point of contact with the records, is shaped to conform with the outer periphery of the record.

When records of a predetermined smaller diameter are used in the magazine, they are first inserted in metallic record holder, disclosed in Fig. 1 of U. S. Patent No. 2,285,139, which holder has the same outside diameter as the previously mentioned records of maximum size.

The lateral range of movement of the entire magazine on shaft 12 and track 16 is sufficient to permit each record or record held in a record holder to be registered edgewise in alignment with the center of the transfer mechanism and the center of the turntable.

*Record transfer mechanism*

Figures 6, 7, 13:
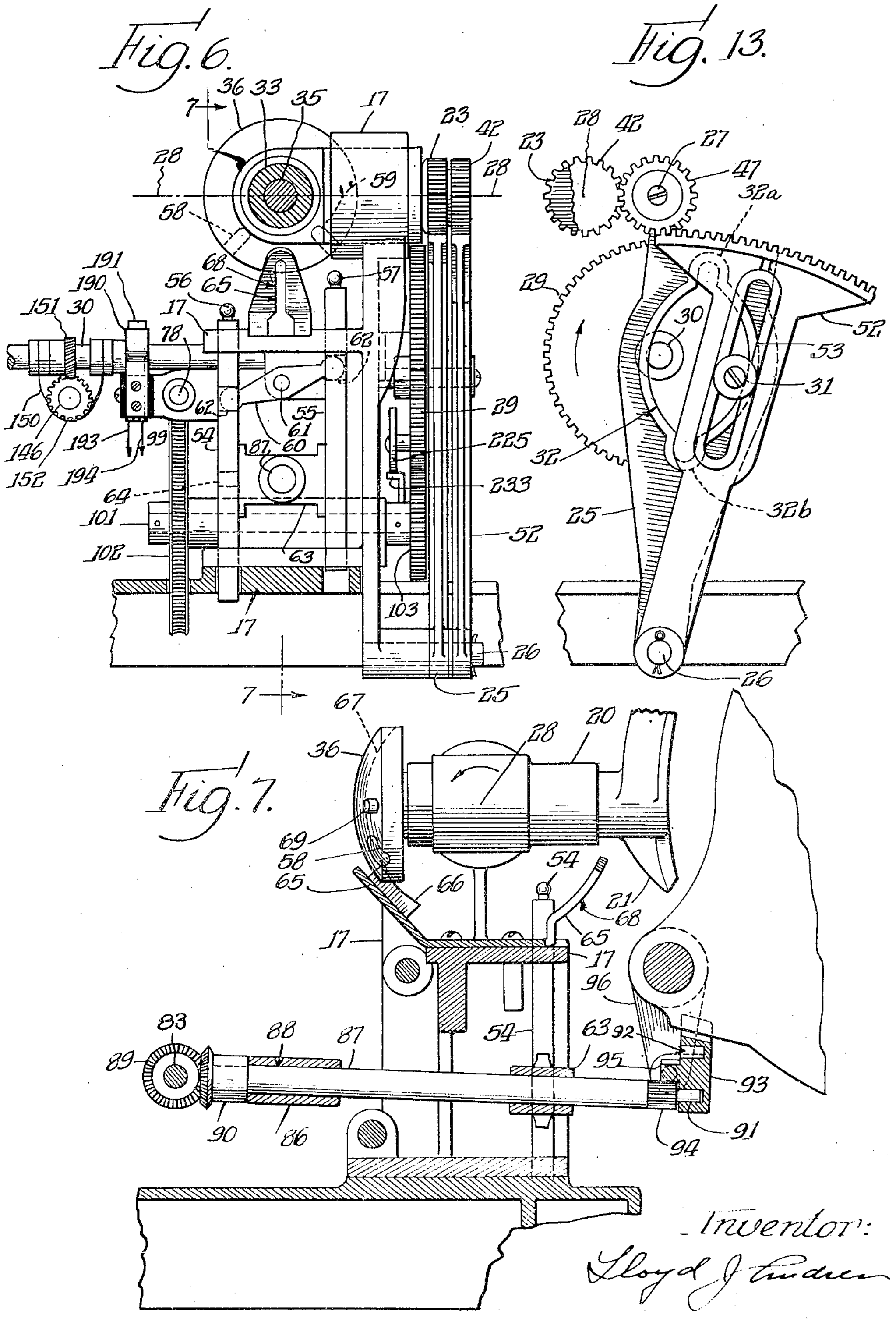
Fig. 6 is a fragmentary side view elevation taken along section line 6—6, Fig. 3.
Fig. 7 is a fragmentary side view elevation taken generally through section line 7—7, Fig. 6.
Fig. 13 is a fragmentary elevation of mechanism showing Fig. 1 in changed position.
Figure 11:
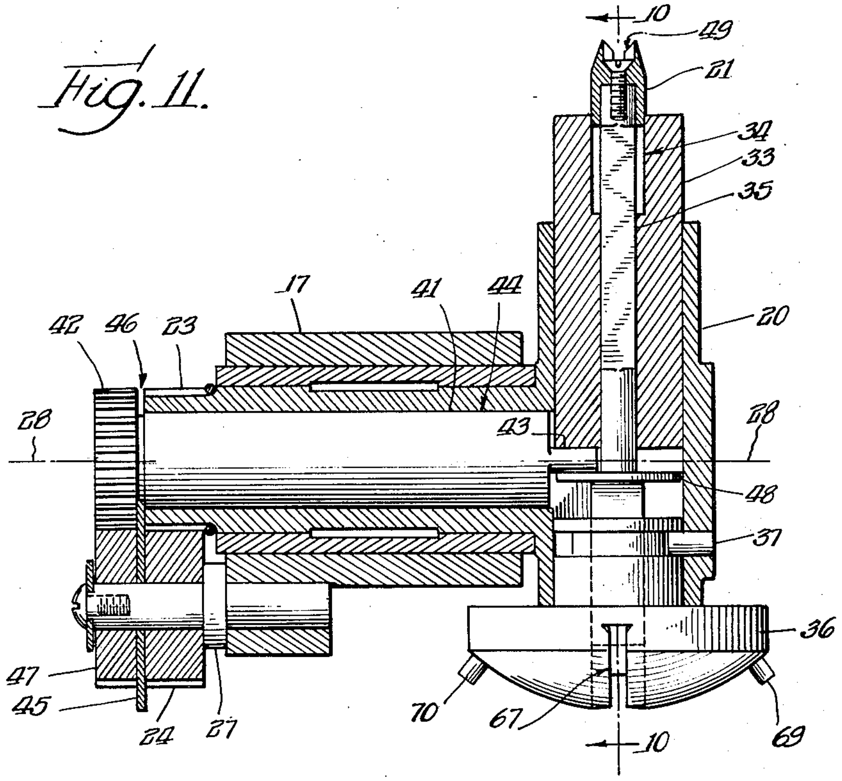
Fig. 11 is a cross-sectional view taken generally along section line 11—11, Fig. 10.
Figure 10:
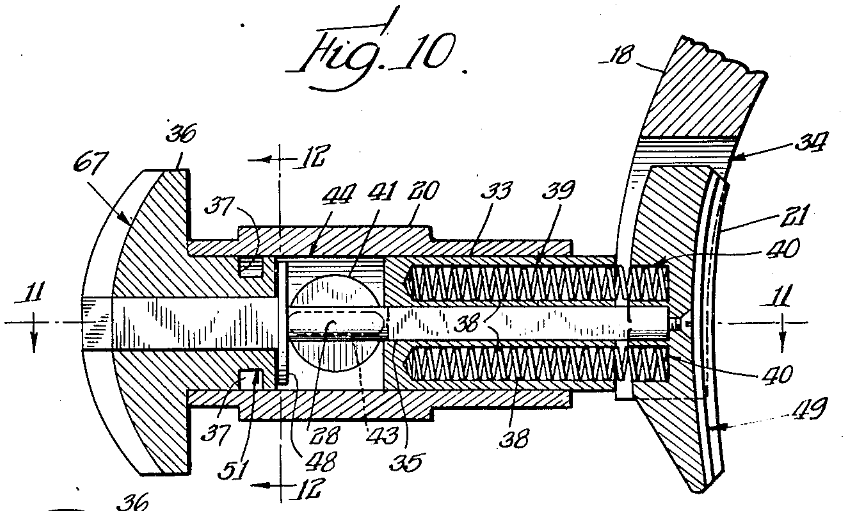
Fig. 10 is an enlarged fragmentary cross-sectional view taken along section line 10—10, Figs. 3 and 11.

Referring to Figs. 1 and 2, the record transfer mechanism 3 is carried by support 17 affixed to the base 1. A record clamp 18, having a record gripping shoe 19 integral with its outer end, is slidably and rotatably held in a housing 20 carried by support 17. An inner record shoe 21 is slidably retained in record clamp 18 and positioned opposite record gripping shoe 19. The outer shoe 19, shown Fig. 1, and the inner shoe 21, shown more clearly in Figs. 7, 10 and 11, are provided with V-shaped grooves 49 in their inner peripheries for the purpose of centering and holding a record gripped therebetween. When the mechanism is in its inoperative position, the record clamp 18 is in the position shown in full lines in Fig. 1 with its outer end held in a notch in bracket 22 with adequate distance between shoes 19 and 21 for the unrestricted lateral movement of the magazine carrying a repertoire of records.

By means of elements to be hereinafter described, any record or record holder is concentrically gripped along its opposite edges between the record shoes 19 and 21 by the rotation of housing 20 about its axis 28 and released on the turntable 4 with the selected side of the record uppermost for playing as shown in dotted lines Fig. 2.

The housing 20, Figs. 1 and 2, is rotated about its axis 28 approximately 180 degrees in its support 17 by gear 23, integral with the housing and engaged with idler gear 24 rotatably retained by shaft 27 affixed to the support 17. A record transferring quadrant gear 25 pivotally secured on a fixed shaft 26, integral with the base 1, is engaged with gear 24 shown in Figs. 1, 2, 6, and 13 collectively. A master transfer gear 29, driven by shaft 30 in support 17, is provided with a crank pin 31 on its outer face which pin projects through an opening 32 in transfer quadrant gear 25. The opening is provided with an upper transfer slot 32*a* and a lower transfer slot 32*b*. The curvature of the remaining oppositely disposed internal surfaces of the quadrant gear 25 are proportioned to alternately coincide with the circular path of travel of the pin 31.

Referring to Fig. 1, when the gear 29 is moved in the direction shown by arrow, the pin 31 will engage the slot 32*a* and move the quadrant gear 25 to position shown Fig. 13, and in so doing, rotate idler gear 24 and the housing gear 23 one-half revolution to transfer a record from the magazine to the turntable. Continued rotation of the gear 29 will ultimately cause the pin 31 to engage the lower slot 32*b* in the quadrant gear 25 and return the quadrant gear to its original position shown Fig. 1, and return the record clamp 18 from the turntable to its original position of rest around the magazine.

Figure 12:
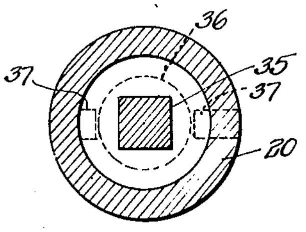
Fig. 12 is a cross-sectional view taken along section line 12—12, Fig. 10.

The records are concentrically gripped and released between shoes 19 and 21 by mechanism contained in the housing 20 shown in sectional views Figs. 10, 11, and 12, which views also show part of the elements employed for rotating each record 90 degrees during its transfer from its normal vertical position in the magazine to a horizontal position with its pre-elected side uppermost on the turntable. The cylindrical inner end 33 of the record clamp 18 is slidably and rotatably fitted in housing 20. The inner record shoe 21 is slidably fitted in a rectangular recess 34 in the record clamp 18 and integrally attached to the end of a shaft 35. The cylindrical end of the shaft is slidably fitted through a concentric bore along the axis of the cylindrical end 33.

Referring to Figs. 10 and 11, record turning cam 36 is retained for rotation in housing 20 by pins 37 integral with said housing, projecting into groove 51 in the cam, the axis of which coincides with the axis of the shaft 35. The rectangular end of shaft 35 is slidably positioned in the rectangular hole provided in the cam. A pair of compression springs 38 are retained in pockets 39 and 40 in the record clamp 18 and inner shoe 21 respectively for urging the inner shoe 21 and the record clamp 18 in opposite directions along the axes of the shaft 35 and the inner end 33.

Fig. 12 shows the relative positions of the housing 20, cam 36, and the pins 37 with respect to the square end of the shaft 35.

Referring to Fig. 11, a shaft 41 having a pinion 42 integral with its outer end and terminating in a tongue 43 at its opposite end is rotatably retained concentric with the bore 44 in housing 20 by a floating washer 45 on shaft 27. The edge of the washer is slidably positioned in groove 46 and shaft 41. An idler pinion 47, independently rotatably secured on shaft 27, is engaged with pinion 42 for rotating shaft 41. A disc 48, having one face in contact with the tongue 43, is positioned against a shoulder on shaft 35 at the junction of its square and cylindrical portions.

When a record is clamped between the shoes 19 and 21, shown Fig. 1, the elements of the clamping mechanism assume the position shown Fig. 11. When the shaft 41 is rotated 90 degrees with respect to the housing 20 by rotation of pinions 47 and 42, opposite long edges of tongue 43 will correspondingly bear against one side of the disc 48 and the end surface of the cylindrical portion of the clamp end 33. This rotation will move the shaft carrying the inner shoe 21 and the clamp 18 an equal distance in opposite directions (shown Fig. 10) sufficient to unclamp a record held between shoes 19 and 21, shown in Fig. 1.

Figure 14:
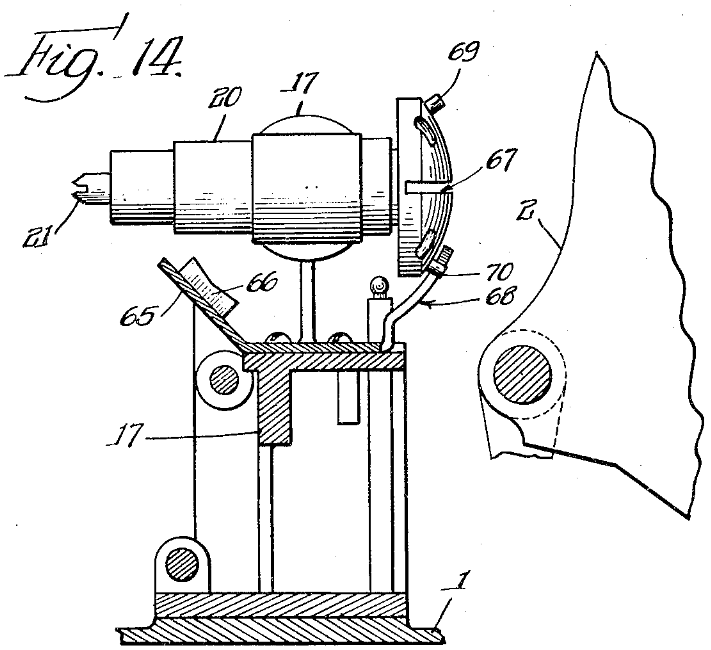
Fig. 14 is a fragmentary side view of elements showing Fig. 7 in changed position.

Referring to Figs. 1, 2, 11 and 13, a record clamping quadrant gear 52 is pivotally mounted on stud 26 adjacent to transfer quadrant gear 25, and provided with the same teeth and pitch diameter as gear 25. A radial slot is provided in the gear 52 in engagement with the crank pin 31. When master gear 29 is rotated in the direction as shown by arrow, Fig. 1, approximately one-third revolution, gear 25 will rotate pinion 42 through idler gear 47 to clamp the opposite edges of a record positioned by the magazine. A further one-third revolution of gear 29 will rotate gear 52 and gear 25 through identical angles. The gear 25 is rotated by virtue of pin 31, abutting an internal surface of the quadrant gear upon entering slot 32*a*, which will cause the housing 20 to rotate about its axis 28, approximately 180 degrees by virtue of idler pinion 24 and housing gear 23. This second one-third rotation of master gear 29 will not disturb the relationship of the clamping elements operated by gear 42 as there is no relative movement between the pinion 42 and the housing 20 in which the clamping elements are contained. A further one-third revolution of the master gear 29 in the same direction will rotate the gear 52, pinion 27, and pinion 42, approximately 180 degrees, which will move the shoes 19 and 21 in opposite directions to unclamp a record on the turntable. This latter rotation of gear 29 is limited to a position corresponding to the horizontal position of the record clamp above the turntable by virtue of the disengagement of pin 31 from the slot 32*a*. At the completion of the record transfer and the unclamping of the record upon the turntable, the gears assume the position shown in Fig. 13. The housing 20 now assumes the position shown, Fig. 14, with respect to the record magazine. The record is returned to the magazine by a further one-half revolution in the same direction of the gear 29 by the identical three cycles of operation of gears 25 and 52 and their constantly meshed associate gears, in reverse direction with the exception that pin 31 will engage slot 32*b* for transferring the record from the turntable to the magazine instead of the slot 32*a*.

When a record is being transferred from the magazine to the turntable, it is rotated from its normal vertical position 90 degrees to a horizontal position by elements shown, Fig. 6, in which a pair of record turning pins 54 and 55 are journalled for vertical reciprocation in support 17. Each pin terminates in identical spherical ends 56 and 57, which ends are adapted for alternate engagement in corresponding cavities 58 and 59 in the turning cam 36. The inside surfaces of the cavities are shaped to afford sliding and turning contact with the ends 56 and 57. A toggle lever 60, pivotally secured to the support 17 by pin 61, has its outer ends operatively fitted in identical notches 62 in pins 54 and 55. A block 63 is pivotally retained in positions shown in Figs. 6 and 7 by stud 64 in a hole in the pin 54. When the block 63 is reciprocated vertically by means to be hereinafter described, the pins 54 and 55 will be reciprocated in opposite directions by the action of the toggle lever 60. The ends of the pins 56 and 57 are thus alternately positioned for movement into the paths of the cavities 58 and 59 when the housing 20 is rotated around its axis 28 as shown by arrow, Fig. 7.

A bracket 65 shown in Figs. 6 and 7 is affixed to support 17 under the housing 20 for the purpose of guiding and positioning the housing 20 before, during, and after its rotation about its axis 28. A tongue 66, integral with one end of the bracket 65, is in engagement with an arcuate slot 67 in the cam 36 shown Figs. 5, 10, and 11. The opposite end of bracket 65 contains an arcuate slot 68 for alternate engagement with studs 69 and 70, which are oppositely disposed in the face of the cam 36 shown Figs. 5, 7, and 11, when the housing 20 is rotated to a position shown Fig. 14.

Figures 5, 8:
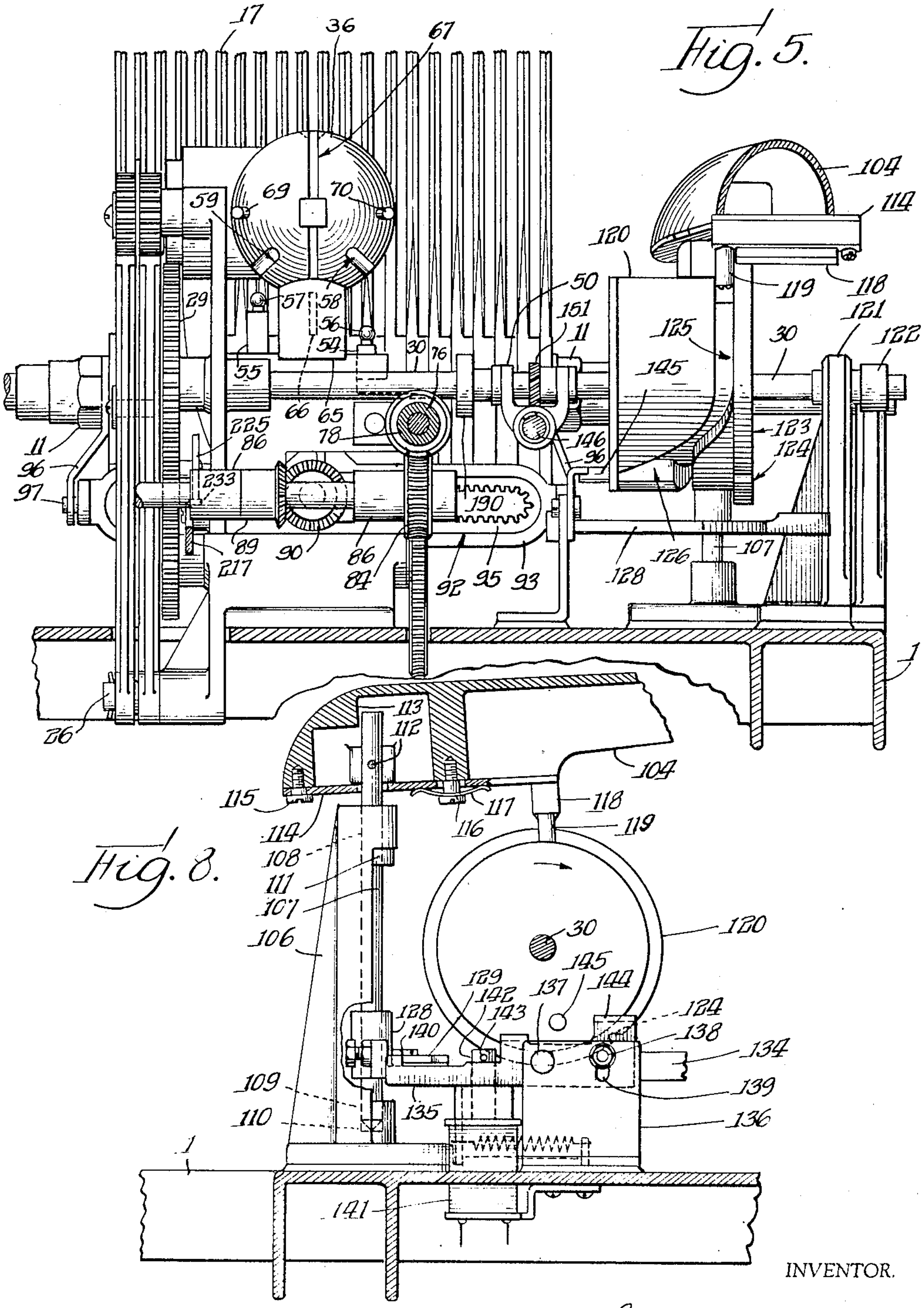
Fig. 5 is a fragmentary end view elevation taken through section line 5—5, Fig. 3.
Fig. 8 is a fragmentary side view elevation taken generally through section line 8—8, Fig. 3.

Referring to Figs. 5, 6, and 7, and under the assumption that the pin 55 is in its uppermost position, and that the housing 20 is rotated about its axis 28 by gear means heretofore described, the cam 36 will be held in position shown in Fig. 7 by the tongue 66 only until the spherical end 57 of the pin engages cavity 59 in the cam. Continued rotation of the housing will cause the cam 36, the shoe 21, and the clamp 18 to rotate 90 degrees about their common axes. When the rotation of the above members is completed, the pin 70 will engage slot 68 in the bracket 65, and hold the cam 36 and its associated record turning members in the position shown in Fig. 14, which corresponds to the position of the record clamp 18 shown in dotted lines, Fig. 2. It is apparent from the foregoing that when the pin 55 is moved to its lowermost position, the pin 54 will be projected to its uppermost position. Under these conditions and assuming that the housing 20 is rotated in the direction shown by arrow Fig. 7, the cam 36 and the record clamp 18 will rotate about their common axes 90 degrees in the opposite direction, thus positioning a record held in the clamp with its reverse face uppermost on the turntable.

*Turntable and transmission*

The transmission will be described by referring to Fig. 3 in which a fragmentary view of a coupling 71 is connected to the drive shaft of clutch member 74. A conventional worm and worm wheel (not shown) in the gear box 73 are utilized to drive the turntable shaft 75, and the turntable 4.

A hollow shaft integral with selector clutch member 77 and worm gear 76 is adapted for rotation on the record transfer drive shaft 78 which is journalled in bearing support 79. A selector drum 80 is geared for rotation with worm gear 76 through worm wheel 81, worm gear 82, shaft 83, and worm wheel 84 shown Fig. 5. Shaft 83 is journalled in bracket 85 and bearing support 79 which are affixed to the base 1. A yoke 86 is journalled and supported on shaft 83 and carries pinion shaft 87 for rotation in bore 88. A miter gear 89 is secured to shaft 83 and is engaged with a mating miter gear 90 secured to one end of the pinion shaft 87.

Referring to Fig. 7, the pinion shaft 87 is shown supported in bore 88 of yoke 86, and in the bore of block 63 with a concentric pilot shaft 91 projecting into an endless groove 92 in rack member 93. The rack member 93, better shown in Fig. 5, is pivotally secured at opposite ends to the record magazine by brackets 96 held by nuts 11. A cylindrical projection 97 at opposite ends of rack member 93, projects through holes in the brackets 96 to provide for tilting movement of the rack member to correspond with the angular movement of the pinion shaft 87.

It is apparent from the above description that when the shaft 83 is revolved continuously in one direction by worm gear 76, the shaft 87 will cause the entire magazine to reciprocate laterally by virtue of the constant engagement of the pinion 94 with the rack 95 in the rack member 93. Since the yoke 86 is free to pivot about shaft 83 the pinion shaft carrying the block 63 will reciprocate in a vertical direction when the pinion 94 travels around the opposite ends of the rack 95.

Clutch member 98 shown in Fig. 3 is secured to one end of the shaft 78 which shaft is journalled in supports 79 and 99, and is integral with worm gear 100. Referring to Fig. 6, a jack shaft 101, journalled in support 17, carries at one end worm wheel 102 which is meshed with worm gear 100 (shown Fig. 3). A spur gear 103 is secured to the opposite end of jack shaft 101 and serves as a driver for the master gear 29 and shaft 30. Thus, it is apparent that periodic rotation of shaft 78 will drive the record transfer elements previously described to transfer records from the magazine to the turntable and return to the magazine.

The clutch members 74, 77, 98 and their associated clutch control member 153, together with the strikers 234, 235, 236, and 237 (better shown Fig. 4) do not comprise subject matter claimed in the present application, and therefore their detailed description and operation will be omitted other than the general relationship the clutch bears to the operation of this mechanism.

*Reproducer*

The reproducer arm assembly 5, shown Fig. 2, consists of two principal parts, the main arm 104 and a reproducer member 105, the latter part containing a conventional electric reproducer and stylus for engaging grooves of a record.

Referring to Figs. 5 and 8, the arm 104 is supported and positioned for horizontal movement by bracket 106 secured to the base 1. A vertical pivot shaft 107 is journalled in bracket 106 in bearings 108 and 109 terminating at its lower end in pivot bearing 110. A collar 111, secured to shaft 107, prevents vertical movement of the shaft. The arm 104 is pivotally secured to the upper end of shaft 107 by pin 112 integral with the shaft and journalled at opposite ends in arm 104 as shown in Fig. 2. The downward vertical movement of arm 104 is limited to a predetermined horizontal position when boss 113, integral with arm 104, rests against the end of shaft 107. A plate 114 is pivotally secured to the under side of arm 104 by shoulder screw 115. A shoulder screw 116, threaded into the arm 104 through a clearance hole in plate 114, retains a spring washer 117 bearing against the under side of the plate to urge the plate into relatively high frictional contact with the lower surface of the arm 104. A vertical cam follower 118 is secured to the forward end of plate 114.

The main arm 104 is controlled by cylindrical cam 120 secured to and driven by shaft 30 previously described. The cam end of shaft 30 is journalled in a support 121 secured to the base 1 and positioned for rotation by collar 122. A depression 124 in the periphery of the cam rim 123 permits the vertical lowering and raising of the arm 104 under the influence of gravity to its stop 113, when the cam is rotated to a position where the depression 124 in the rim coincides with the follower 118. Likewise, the arm 104 is raised vertically when the cam is rotated to a position where the follower 118 rides out of the depression 124. The lateral movement of the arm 104 is controlled by a cylindrical channel 125 into the periphery of the cam into which the lateral follower pin 119 projects.

Referring to Fig. 5, it is to be noted that the channel 125 leads into a clearance opening 126 which, when positioned properly with respect to follower pin 119, will permit the unrestricted lateral movement of the reproducer arm over the record for playing. A stop 238 secured to the base 1 is provided to limit the outward swing of the reproducer assembly 5 to a position *a*, Fig. 2.

Referring to Figs. 1 and 2, it is to be noted that the reproducer member 105 joins the main arm 104 in a hinge 127. The hinge provides vertical angular movement to the member 105 with respect to the arm 104. The range of angular movement is limited by stops (not shown) to approximately 2 degrees. Thus, when the main arm 104 is in its lowered position, the reproducer member is capable of a free floating vertical movement when its stylus is engaged with the playing grooves of a record on the turntable. When the arm 104 is raised by means to be hereinafter described, the reproducer member 105 will also raise and clear the record when the vertical play in the hinge 127 is taken up by the upward movement of the arm 104.

A reproducer control member 128 shown Figs. 3, 5, and 8, is adapted to control the different positioning of the reproducer assembly 5 for starting the play of records of two different diameters and also for initiating the cutoff mechanism upon the completion of the play of a record. A lever 129 is adjustably secured to member 128 by screws 130 and 131. A cutoff projection 132 is integral with the long arm of member 128 and is moved by the reproducer assembly 5 to a position corresponding with the completion of play of a record on the turntable. The reproducer arm positioning latch 135 is pivotally supported for vertical movement on bracket 136 by stud 137. A screw 138 projects through slot 139 in latch 135 and is secured in a hole in bracket 136 by means of a nut. The latch 135 is thus urged into frictional contact with bracket 136. An abutting projection 140 on latch 135 is provided to engage the free end of the lever 129 only when the latch 135 is in its uppermost position.

An electromagnet 141 is secured to the base 1 under the latch 135 with the upper end of its vertically movable core 142 pivotally secured to latch 135 by pin 143. When the magnet 141 is energized, the core 142 will move the latch 135 by overcoming the friction between the latch and the bracket 136 to move the abutment 140 below its path of engagement with lever 129. An abutment 144, integral with the latch 135, is positioned in the path of restoring pin 145 secured in cam 120. Thus, it is apparent that when the abutment 140 of latch 135 is in its lowermost position, the abutment 144 is in its uppermost position, and when the cam 120 is turned in the direction shown by arrow, the pin 145 will contact and restore the latch 135 to the position shown in Fig. 8.

*Controls*

Referring to Fig. 3, a clutch control shaft 146 is supported for rotation at one end by bearings 147 and 148, and collar 149, and is supported at its opposite end by yoke 150 suspended on shaft 30. A spiral gear 151 on shaft 30 is meshed with a mating gear 152 secured to the yoke end of shaft 146 shown Figs. 3, 5, and 6. Since gears 151 and 152 are the same diameter, one revolution of shaft 30 will rotate shaft 146 one revolution. Referring to Fig. 3, the clutch control member 153 is mounted for independent rotation on shaft 146. A coil spring 154 surrounding shaft 146 has one end secured to member 153 and its opposite end secured to shaft 146 by screw 155, and is normally tensioned to urge the member 153 to rotate on shaft 146.

Figure 4:
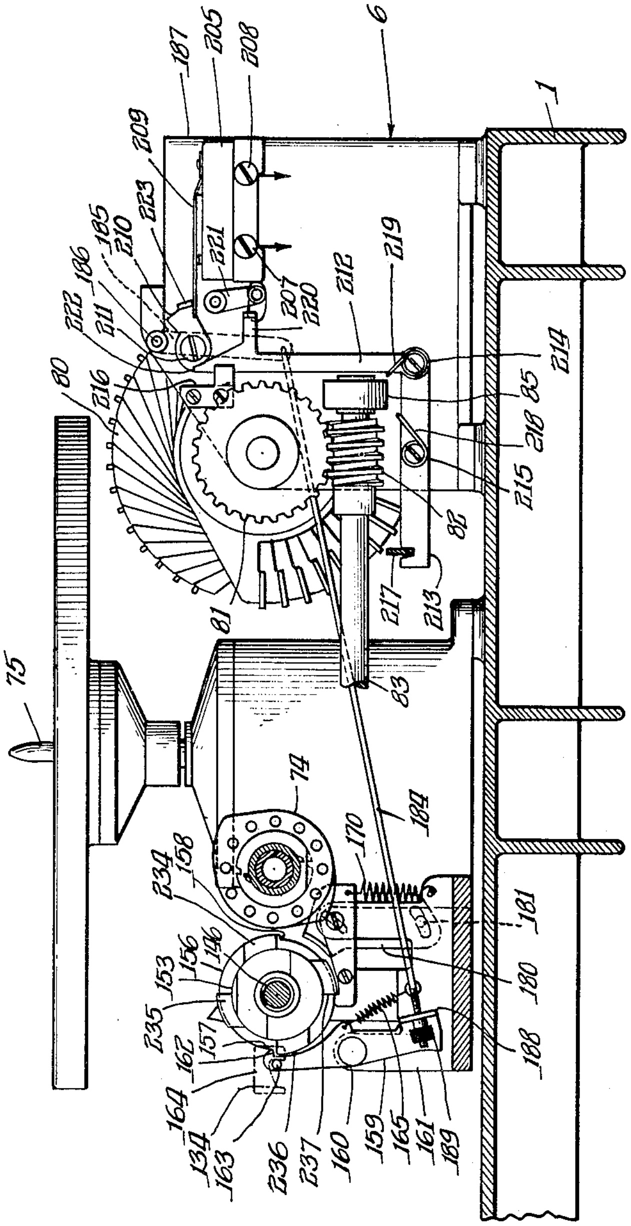
Fig. 4 is a fragmentary side view elevation taken through section line 4—4, Fig. 3.

Referring to Fig. 4, a clutch member release disc 156 is integral with clutch member 153 and contains two radial abutments 157 and 158 in its periphery. A clutch release latch 159 is pivotally mounted by stud 160 to an upright 161 secured to the base 1. An abutment 162 at the upper end of latch 159 is adapted to engage mating abutments 157 and 158 on disc 156. A release pin 163 is secured to the upper end of latch 159 and is engaged with a projection 164 on the end of the latch 134.

Figure 9:
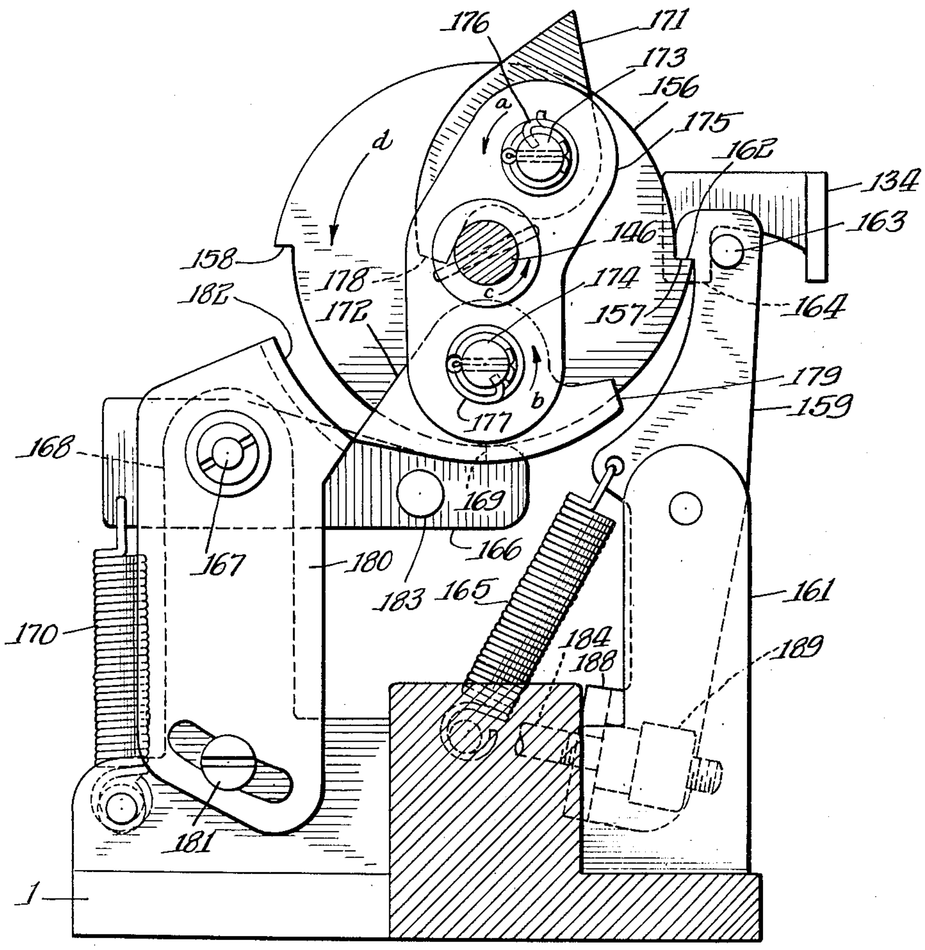
Fig. 9 is an enlarged fragmentary cross-sectional view taken through section line 9—9, Fig. 3.

Part of the clutch control mechanism shown in Fig. 3 is better illustrated in enlarged view Fig. 9, in which a spring 165 has one end secured to the base 1 and its opposite end secured to latch 159 for the purpose of normally urging its abutment 162 into contact with the periphery of the disc 156. A second clutch release latch 166 is pivotally mounted by stud 167 to upright 168 secured to the base 1. An abutment 169 in one end of the latch 166 is positioned for alternate engagement with abutments 157 and 158 in the disc 156. A spring 170 secured at one end to the base 1 and having its opposite end secured to latch 166, normally urges latch 166 with its abutment 169 into contact with the periphery of disc 156. A pair of identical clutch operating dogs 171 and 172 are pivotally mounted on studs 173 and 174 secured in the face of a flange member 175 having its hub pinned to the shaft 146. Coil springs 176 and 177 having their corresponding ends secured to dogs 171 and 172 and their opposite ends secured to studs 173 and 174 respectively, normally urge the dogs in the direction shown by arrows *a* and *b* respectively. The projections 178 and 179 of the dogs are normally urged against the shaft 146, which acts as a stop. A dog loading and release plate 180 is adjustably secured to upright 168 by stud 167 and screw 181. Circular land 182 of plate 180 is positioned in the path of the pointed ends of the dogs 171 and 172. A release pin 183 is secured to latch 166 and is also positioned in the path of the pointed ends of the dogs. It is now apparent that when shaft 146 is rotated in the direction shown by arrow *c* the flange member 175 will rotate and cause the leading edge of dog 171 to contact the land 182 of plate 180. Continued rotation of shaft 146 will cause the dog to pivot about its stud 173 against the restraining action of spring 176. When either dog has reached the position of the dog 172 shown in Fig. 9, its pointed end will disengage from the land 182 and will rapidly move in the direction shown by arrow *b*, and in so doing, the pointed end of the dog will strike the pin 183 and move the abutment 169 of latch 166 in a downward direction. Thus, under the conditions when abutment 169 is in engagement with either abutment 157 or 158 of the disc 156, the action previously described will release this engagement and permit the disc to rotate in a direction shown by arrow *d* to a position shown in Fig. 9 with the abutment 162 of latch 159 in engagement with one of the abutments of disc 156. Since the disc 156 is integral with the clutch member 153 shown in Fig. 3, the latter element will also rotate on shaft 146 by virtue of the energy stored in spring 154.

Referring to Fig. 4, a selector control rod 184 is pivotally secured at one end to a selector operating lever 185 which is integral with selector operating shaft 186 pivotally journalled in selector frame 187. The opposite end of rod 184 is adjustably secured for small pivotal movement in offset 188 of latch 159 by nut 189.

Referring to Figs. 3, 5, and 15, a cam 190, made from insulating material and having a cavity 204 in its outer periphery, is secured to shaft 30. A pair of switch springs 191 and 192 having terminals 193 and 194 respectively, are supported by and insulated from support 99 with blade 191 positioned in operating contact with the periphery of cam 190, whereby each revolution of shaft 30 will cause spring 191 to contact spring 192 for a predetermined period.

Referring to Figs. 1 and 15, a contact housing 195 is secured by screws 196 and 197 to the under side of the base 1 with a rectangular opening 198 through the base thereabove. Two pairs of contact springs 198, 199, 200, and 201, have their terminal ends secured in the housing 195. The central portion of each spring is arcuately formed to normally project upward through opening 202 in the housing 195 into the path of the lower periphery of records or record holders retained in the magazine 2. The ends opposite the terminal end of each spring are free to move downwardly when the records or record holders contact the formed portion of each spring. Springs 198 and 201 and springs 199 and 200 are connected by independent conductors to terminals 203 and 204 respectively.

A master switch 205, shown Fig. 4, for starting and stopping the electric motor 206, is secured to the selector frame 187 and is normally closed, and mounted thereon are terminals 207 and 208. A flat switch operating spring 209 is shown holding the switch in open position by master switch latch 210 which is pivotally mounted to the selector frame by screw 211 and latched with master switch release lever 212. Lever 212 is pivotally positioned to rocker 213 by screw 214. Rocker 213 is pivotally mounted to the selector frame by screw 215. A bracket 216 serves as an upper guide for lever 212. Restoring bar 217 is engaged in a notch in rocker 213 and when the mechanism is at rest, holds the rocker in a position shown in Fig. 4 against the restraining action of spring 218 secured between the screw 215 and the edge of the rocker. A spring 219, engaged with screw 214 and one edge of lever 212, urges the rocker toward the latch 210. An abutment 220, integral with lever 212, is in the path of the selector trip crank 221. It is obvious that when the crank 221 is moved by the selector mechanism in a clockwise direction, its contact with abutment 220 will move lever 212 against the restraining action of spring 219 and release latch 210 by virtue of the disengagement of mating abutting surfaces 222 between the end of the lever 212 and the latch 210, thus the spring 209 which has been restrained by a projection 223 of the latch 210, will move upward and permit the switch 205 to close by well known elements contained therein. It is also apparent that when the restoring bar 217 is reciprocated in a vertical direction, the lever 212 will re-engage the latch 210 and move the spring 209 in a downward direction to open the switch 205.

Referring to Fig. 3, the restoring bar 217 is shown with one extremity resting on rocker 213. In Fig. 1, its opposite extremity is shown pivotally secured to support 17 by screw 224. A disc 225, shown Figs. 5 and 6, is secured to the inside face of master gear 29 and in position shown is in contact with a projection 233 on the upper edge of restoring bar 217. The master switch 205 is moved into its open position at the completion of the operation of one cycle of operation of the machine by virtue of the disc 225 engaging with projection 233 having a predetermined period during each revolution of the gear 29, which engagement causes the restoring bar 217 and the rocker 213 to reciprocate.

The electrical means employed for initiating the positioning of the reproducer arm 5 for playing records of two predetermined diameters is shown diagrammatically in Fig. 15. A fragmentary view of the electrically conducting record holder disclosed in Patent No. 2,285,139, is illustrated supporting a record of small diameter. The terminal 204 on the contact housing 195 which is connected with springs 199 and 200, is connected by a conductor 229 to terminal 194 of switch spring 191. Terminal 193 of switch spring 192 is connected by conductor 230 to one terminal of electromagnet 141. The remaining terminal of the electromagnet is connected to conductor 228 to one terminal of the low voltage secondary of transformer 226. The remaining terminal of the secondary is connected to housing terminal 203 by conductor 227 which terminal is connected to contact springs 198 and 201. One electric power line L2 is connected by conductor 231 to one terminal of the primary of transformer 226 and to one terminal of the electric motor 206.

The remaining power line L1 is connected to terminal 207 of the master switch 205. Conductor 232 is connected to master switch terminal 208 and the remaining primary terminal of transformer 226 and the remaining terminal of motor 206. When the master switch 205 is closed, the mechanism driving motor 206 will be energized, and it is apparent that when the periphery of the record holder is positioned in contact with springs 198, 199, 200, and 201, that at least one pair of these springs will close a circuit to terminals 203 and 204, through the secondary of transformer 226 and switch springs 191 and 192, when the cam 191 is positioned as shown, to energize magnet 141.

*Selector*

The selector assembly shown in part in Figs. 1, 2, 3, and 4, is substantially the same, both in construction and mode of operation, as the selector assemblies shown in U. S. Patents, 1,752,170, 2,118,541, 2,175,142 and Re. 21,514. Therefore, a detailed description will be omitted other than reference to elements that are directly related to the mechanism herein described. The drum 80, shown Figs. 3 and 4, is the same as the drum 61 shown in U. S. Patent Re. 21,514 (Figs. 9 and 10), and is adapted to rotate one revolution in timed relation with one complete to-and-fro movement of the magazine 2 (Fig. 2). The gears 81 and 82 for driving the drum, shown Figs. 3 and 4, are the same as gears 41 and 42 shown in U. S. Patent 2,118,541 (Fig. 7). The switch tripping crank 221 shown Fig. 4, is the same as the crank 203 shown U. S. Patent Re. 21,514 (Fig. 6). Likewise, the selector operating lever 185 shown Fig. 4 is the same as element 189*a* and arm 195 shown in U. S. Patent Re. 21,514 (Figs. 6 and 9).

It is well known that a selector of this type can be coupled with a movable magazine containing a plurality of equally spaced records, whereby the elements of the selector will control the positioning of the magazine to register any selected record to a position for transfer to a turntable for playing. The selector contains a plurality of either manual or electrically releasable latches corresponding with each side of the record in the magazine, and the release of any latch will initiate the starting of the mechanism. This type of selector contains means for providing plural selectivity for each side of each record contained in the magazine when adapted to the record player described above.

*Operation*

Under the assumption that the mechanism is in the position shown in full lines in Figs. 1 and 2, and under the assumption that a particular side of a particular record of small diameter, held in a holder is to be played and a corresponding latch (not shown) in the selector 6 is tripped, the selector trip crank 221 (Fig. 4) will strike abutment 220 and move the lever 212 against the restraining action of spring 219 and release its engagement with master switch latch 210 which will rotate the coupling 71 (shown Fig. 3), shaft 72, clutch member 74, turntable shaft 75, and the turntable 4 thereon (Fig. 2). Since clutch member 74 is in engagement with selector clutch member 77, shaft 83 will be driven by worm gear 76 and worm wheel 84. The selector drum 80 and pinion shaft 87 will simultaneously begin its lateral movement by virtue of the engagement of the pinion 94 on shaft 87 with the endless rack 95 (Figs. 7 and 5). When a particular stud (not shown) on selector drum 80, encounters its corresponding latch (not shown) in the selector 6, the selector operating lever 185 shown Fig. 4, will reciprocate one time and pull latch 159 momentarily out of engagement with abutment 157 in the disc 156. This will permit the clutch member 153 and the disc 156, under the influence of energy stored in spring 154 (Fig. 3) to rotate about shaft 146. The rotation of the disc 156, better shown Fig. 9, will be arrested after approximately 90 degrees movement by engagement of abutment 169 of latch 166 with the disc abutment 158. The rotation of clutch member 153 (Fig. 3) will cause striker 235 to disengage clutch member 77 from clutch member 74, and simultaneously cause clutch member 93 to engage with clutch member 74. This operation will stop shaft 83 and its associated moving parts including the magazine 2, which will be positioned with the selected record in position for transfer which completes the selecting cycle, and starts the rotation of shaft 78 which begins the transfer cycle.

Under the assumption that a record of small diameter, held in a record holder, was selected, the magazine has now moved the selected record with the edge of its holder into contact with springs 198, 199, 200, and 201, shown Fig. 15, and directly under the record clamp shown Figs. 1 and 2. At this position of operation, a partial circuit will be established through the edge of the conducting record holder and at least one pair of springs 198, 199, 200, and 201 of opposite polarity, through the transformer 226 and the electromagnet 141. This circuit will not be completed until the normally open switch 191—192 is closed by further rotation of the cam 190 on shaft 30.

Referring to Figs. 3 and 6, the rotation of shaft 78 will drive master gear 29 through its mating gear 103, shaft 101, worm wheel 102 and worm gear 100. The master gear 29, quadrant gear 52, and record clamp 18, are shown (Fig. 1) in their rest positions and it follows that the first one-third revolution of the master gear 29 in the direction shown by arrow by virtue of pin 31, will move the quadrant gear 52 about its stud 26 in a clockwise direction and drive idler pinion 47 and pinion 42 (Fig. 13) which will move the clamp 18 and its shoe 19, and the shoe 21, equal distances toward the center of the magazine 2 to grip opposite edges of the selected record therebetween by means of mechanism previously described and shown in Figs. 10 and 11. At this point the pin 31 will have moved to a position of engagement with a slot 32*a* in quadrant gear 25.

During the above one-third movement of gear 29, the cam 190 (Figs. 3, 6, and 15) will have moved until the offset in the switch spring 191 momentarily engages the depression 204 in the cam and will momentarily close switch springs 191 and 192, thereby completing a circuit heretofore described, thru electromagnet 141. When electromagnet 141 (Figs. 3 and 8) is energized, its core 142 will pull the latch 135 and its abutment 140 out of the path of movement of the lever 129 against the restraining action of friction between the latch 135 and the bracket 136. A further movement of the cam 120 will move pin 145 into contact with the top surface of horizontal abutment 144 of lever 145 and restore the lever to its normal horizontal position.

The second one-third revolution of master gear 29 in the direction shown by arrow, Fig. 1, will engage its crank pin 31 with slot 32a and move quadrant gear 25 and quadrant gear 52 about their common stud 26 an equal angle of rotation which will cause an 180 degree rotation of housing 20 about its axis 28, by virtue of idler gear 24 and gear 23, which movement will transfer the selected record supported in the record clamp 18 from the magazine to its playing position on the turntable. When the transfer of the record is completed, the pin 31 will have just left its engagement with the slot 32a which completes the clockwise rotation of quadrant gear 25. A further one-third revolution of master gear 29 and pin 31 in the direction shown by arrow, Fig. 13, will continue the movement of quadrant gear 52 in the same direction, and will rotate gear 42 through idler gear 47, with respect to housing 20 to unclamp the record which has been transferred to the turntable by means of the opposite movement of shoes 19 and 21 through the operation of elements shown Figs. 10 and 11, and previously described.

During the second one-third revolution of gear 29 and when the selected record has been completely withdrawn from the magazine, and in approximately the position shown in dotted lines, Fig. 1, the record clamp and the record contained therein, begin their 90 degree rotation in order that the record will be in a horizontal position when the transfer is completed. This movement is accomplished by the engagement of the spherical end 57 of record turning pin 55 with its corresponding cavity 59 in cam 36 shown Fig. 5. In the event the opposite side of the record was selected, the pinion 94 (Fig. 7) would have been in engagement with the upper side of the rack 95 and the magazine in the identical lateral position with respect to the base. This would have resulted in pin 54, shown Figs. 5, 6, and 7, to be in its upper position, and pin 55 in its lower position by the movement of the toggle lever 60. Under these conditions, spherical end 56 would have been positioned for engagement in its corresponding cavity 58 in cam 36, and the cam and the record clamp would have rotated 90 degrees in opposite direction, which would place the opposite side of the selected record uppermost on the turntable for playing.

Since the reproducer arm cam 120 is secured to shaft 30, it will revolve in timed relation with the master gear 29 and during the first two-thirds revolution of the cam, the slot 125 in the cam will transmit no lateral motion to follower pin 119, but during the time that a record is being unclamped on the turntable, the channel 125 will have moved laterally with respect to the pin 119 to move the reproducer arm assembly 5 from a position of rest at *a* shown Fig. 2, to a position *c* where the stylus is directly above the starting grooves of a record of a small diameter held in a record holder. At the completion of the third one-third revolution of the cam 120, the vertical cam follower 118, which has been in gravity contact with the rim 123 of the cam 120, will encounter depression 124 shown Figs. 5 and 8, whereupon the reproducer assembly 5 will be lowered sufficiently for the stylus in the reproducer member 105 to engage the surface of the record. The arm 104 will continue its downward descent slightly after the stylus is in contact with the record to allow freedom of movement of member 105 through hinge 127 and until the stop 113 in arm 104 encounters the upper extremity of shaft 107. When the cam is in this position, the clearance opening 126 (Fig. 5) will be laterally adjacent to follower pin 119, which will permit the reproducer assembly 5 to move freely towards the center of the turntable while the stylus is in engagement with the spiral grooves of a record.

Referring to Fig. 3, shaft 146 will rotate in exact timed relation with shaft 30 through gears 151 and 152 (Fig. 6). The rotation of shaft 146 will tighten spring 154 and store energy therein. Referring to Fig. 9, shaft 146 will rotate flange member 175 carrying dogs 171 and 172. When the mechanism has operated to the point where the cam 120 has completed the lowering of the reproducer assembly 5 into playing contact with the record, dog 172, will leave its engagement with land 182 on plate 180 and its pointed end will strike pin 183 to disengage abutment 169 of latch 166 which had been previously engaged in abutment 158 of disc 156. This will permit spring 154, shown Fig. 3, to rotate clutch member 153 one-fourth revolution. Its movement will be arrested by abutment 158 coming in contact with abutment 162 on latch 159. When the member 153 is in this new position, striker 236 will contact member 74 to release its engagement with clutch member 98, thus stopping the entire transmission with the exception of the turntable, which continues to revolve through the rotation of coupling 71 and shaft 72.

Under the above conditons the reproducer assembly 5 will traverse the playing grooves of a record until the stylus reaches the cutoff groove in the record which corresponds with position *d* (Fig. 2). At this predetermined position of the reproducer assembly 5, the reproducer control member 128 (Fig. 3) will have moved clockwise about the axis of shaft 107 to a position where projection 132 contacts strike screw 133 which will move cutoff latch 134 about its pivot to disengage the projection 162 to release latch 159 shown Fig. 4 against the restraining action of spring 154. This operation will permit disengagement of abutment 162 from disc 156 and permit it and the clutch member 153 (Fig. 3) to rotate one-fourth revolution whereupon notch 157 of disc 156 will engage abutment 169 in latch 166. Under these conditions the playing cycle will be completed and the reverse transfer cycle will have started by virtue of the re-engagement of clutch member 98 with clutch member 74 by the action of the striker 235 contacting clutch member 98. Under these conditions, shafts 78, 30, and 146 will begin rotation.

It is now apparent that a complete cycle of the machine requires the clutch member 153 to make one complete revolution in four steps as a result of the engagement and disengagement of the disc 156 with latches 159 and 166 shown Fig. 9. It is also apparent that the shaft 146 will make one complete revolution for each complete cycle of the mechanism which will result in keeping spring 154 in wound condition. The reverse transfer cycle is identical to the forward transfer cycle except the functions are in reverse order, namely: The reproducer assembly 5 will be moved from position *d* to position *a* shown Fig. 2, by the action of the channel 125 against follower pin 119 (Fig. 5). Simultaneously, shoes 19 and 21 will grip opposite sides of the record on the turntable as a result of the continued rotation of master gear 29 in the direction shown by arrow, Fig. 1, and the operation of elements previously described in Figs. 10 and 11. Referring to Fig. 13, when the record has been gripped, the pin 31 will have moved to a position of entry in slot 32*b* in quadrant gear 25. Continued rotation of gear 29 will move quadrant gears 25 and 52 counter-clockwise about stud 26 and transfer the record to its previous position in the magazine 2 whereupon the pin 31 will disengage from slot 32*b* and arrest the motion of quadrant gear 25 in position shown Fig. 1. The quadrant gear 52 will continue its movement and unclamp the record in the magazine.

During the transfer of the record from the turntable to the magazine, spherical end 57 of pin 55 will have engaged its corresponding cavity 59 in the turning cam 36 to rotate the record 90 degrees to a position parallel to the slots between the record supports 7 shown Fig. 2.

At the completion of the reverse transfer cycle, dog 171, Fig. 9, will have moved to a position occupied by dog 172 shown, and will disengage from land 182 and strike pin 183 in latch 166 to disengage abutment 169 from notch 157 in the disc 156 which will permit the disc 156 to rotate in the direction shown by arrow *d* where notch 157 will engage with abutment 162 of latch 159 corresponding with the position shown in Fig. 9. This latter motion of disc 156 will permit one-fourth revolution of clutch member 163 (Fig. 3) which will disengage clutch member 98 from member 74 and re-engage clutch member 77 with member 74. This completes the transfer cycle and positions the mechanism for the beginning of a second selecting cycle.

At the end of the latter portion of the reverse transfer cycle, disc 225, shown Fig. 6, which is secured to the inside face of master gear 29, will move against projection 233 and move the restoring bar 217 in a downward direction which will oscillate rocker 213, Fig. 4, which oscillation will cause the upper end of lever 212 to reengage the abutting surface 222 of latch 210 and open switch 205 against the restraining action of spring 209 which will stop the rotation of the driving motor 206 shown Fig. 15 and arrest the motion of the entire mechanism unless additional selections had previously been made in the selector 6 which would cause the selector trip crank 221 (Fig. 4) to be in its clockwise position and which would prevent the re-engagement of the end of lever 212 with latch 210 whereupon the motor would continue running and a new selecting cycle would automatically begin.

In the event a record of large diameter in the magazine 2 was selected, its non-conducting edge would have been positioned by the magazine in contact with springs 198, 199, 200, and 201, shown Fig. 15, and subsequently during the momentary closing of springs 191 and 192, which occurs during the beginning of the transfer cycle, a circuit through magnet 141 would not be completed. Thus, referring to Figs. 3 and 8, the latch 135 would remain stationary with its abutment 140 in the lateral path of lever 129 which is affixed to control member 128. Under these conditions, when the cam 120 moves the reproducer arm 5, shown Fig. 2, from its rest position at *a*, its lateral movement will be arrested at a position *e* by engagement of the abutment 140 with lever 129. Since follower pin 119 will continue its lateral movement under the influence of channel 125 in cam 120 to a position corresponding with *c* (Fig. 2), the friction between the plate 114 and the base of the arm 104 will be overcome, and the plate 114 will move with respect to the arm 104 a distance equivalent to position *c*. The continued rotation of the cam 120 will lower the stylus in member 105 in the starting groove of a record of large diameter whereupon the reproducer arm will continue its lateral movement in playing the record until it has reached a position *d* for cutoff (same as record of small diameter). Upon the actuation of the cutoff latch 134 shown Fig. 3 by projection 132, the operations are identical to the operations encountered with playing a record of small diameter, except that the cam 120 will return the reproducer arm 5 against a stop 238 (Fig. 2) secured to the base 1, whereupon the continued lateral movement of follower pin 119 under the influence of cam 120 will restore plate 114 against the restraining action of friction between the plate and base 104 to move the plate to its normal position for playing records of small diameter.

In the event a subsequent selection was made in selector 5, switch 205, Fig. 4, would be closed by the action of crank 221 and the clutch member 77 having been previously engaged with clutch member 74. At the end of the reverse transfer cycle, the selector drum 80 and the magazine 2 would operate simultaneously to position the next selected record for transfer and the machine would automatically repeat all of the operational functions previously described. It is also apparent that the reproducer assembly will be automatically positioned to play the starting grooves of either a record of small diameter held in a holder, or a record of large diameter regardless of their respective positions in the magazine.

Having described my invention I claim:

1. In a record player of the character described the combination of a turntable, a pivotally mounted reproducer arm, adjustable means for placing said arm in position relative to said turntable to play either large-diameter or small-diameter record discs, and electromagnetic means including conductors individually associated with record discs of one of said diameters for adjusting said arm-placing means to place said arm in position to play record discs having said one of said diameters, said arm-placing means being normally adjusted to place said arm in position to play record discs having the other of said diameters.

2. In an automatic record changer of the type including a movable record disc magazine containing indiscriminately placed, non-conductive record discs of large and small diameters, a playing turntable, and a transfer mechanism for transferring a record disc from the magazine to the turntable, the sub-combination of an electrically conductive concentric record holder for each record disc of small diameter, said holder having an outer diameter substantially equal to said large diameter, a shiftable reproducer for the turntable with a stylus to engage and play a record thereon; means operatively related with said tone arm for positioning said stylus to engage the starting groove of a record of large diameter on the turntable, a pair of electrical control contacts positioned in the path of movement of the edge of each of said records and record holders held in said magazine to directly engage the edges of said record holders to close an electrical circuit between said contacts through said holders, and electro-magnetic means responsive to closing said electrical circuit through said contacts and record holders to position the stylus of said tone arm for engagement with the starting groove of a record disc of small diameter on the turntable.

3. In an automatic record changer of the type including a movable record disc magazine containing indiscriminately placed, non-conductive record discs of large and small diameters, a playing turntable, and a transfer mechanism for transferring a record disc from the magazine to the turntable, the sub-combination of an electrically conductive concentric record holder for each record disc of small diameter, said holder having an outer diameter substantially equal to said large diameter, a pivotally mounted tone arm to swing over the turntable with a stylus to engage and play a record thereon; means responsive to the operation of the transfer mechanism and operatively related with said tone arm for positioning said stylus to engage the starting groove of a record of large diameter on the turntable, a pair of electrical control contacts positioned in the path of movement of the edge of each of said records and record holders held in said magazine to directly engage the edges of said record holders to close an electrical circuit between said contacts through said holders, and electromagnetic means responsive to closing said electrical circuit through said contacts and record holders to position the stylus of said tone arm for engagement with the starting groove of a record disc of small diameter on the turntable.

4. In a record player, in combination, a record of electrically non-conductive material, an electrically conductive portion thereon, said conductive portion consisting of an annular metallic band at the outer edge of the record, a tone arm shiftable over the record, a pair of electrical control contacts to directly engage the conductive portion of the record at points spaced apart from each other to close an electrical circuit between said contacts through said conductor portion, and means responsive to closing said circuit to position the tone arm at the starting groove of the record.

LLOYD J. ANDRES.

REFERENCES CITED

The following references are of record in the file of this patent:

UNITED STATES PATENTS

| Number | Name | Date |
|---|---|---|
| 956,727 | Osborn | May 3, 1910 |
| 1,841,593 | Benjamin | Jan. 19, 1932 |
| 2,018,881 | Collison et al. | Oct. 29, 1935 |
| 2,094,250 | White | Sept. 28, 1937 |
| 2,095,467 | Erbe et al. | Oct. 12, 1937 |
| 2,104,032 | Green | Jan. 4, 1938 |
| 2,216,029 | Wright | Sept. 24, 1940 |
| 2,263,643 | Offen | Nov. 25, 1941 |
| 2,286,490 | Knox | June 16, 1942 |
| 2,318,654 | Wissner | May 11, 1943 |
| 2,348,506 | Weaver | May 9, 1944 |